US012613820B2

(12) United States Patent
Wu et al.

(10) Patent No.: US 12,613,820 B2
(45) Date of Patent: Apr. 28, 2026

(54) BUS SLAVE DEVICE AND INTERRUPT REQUEST DETERMINATION METHOD THEREOF

(71) Applicant: NUVOTON TECHNOLOGY CORPORATION, Hsinchu City (TW)

(72) Inventors: Hao Wei Wu, Hsinchu Science Park (TW); Chia-Ching Lu, Hsinchu Science Park (TW)

(73) Assignee: NUVOTON TECHNOLOGY CORPORATION, Hsinchu City (TW)

( * ) Notice: Subject to any disclaimer, the term of this patent is extended or adjusted under 35 U.S.C. 154(b) by 118 days.

(21) Appl. No.: 18/770,307

(22) Filed: Jul. 11, 2024

(65) Prior Publication Data

US 2025/0021502 A1      Jan. 16, 2025

(30) Foreign Application Priority Data

Jul. 13, 2023    (TW) .................................. 112126195

(51) Int. Cl.
*G06F 13/24*            (2006.01)
(52) U.S. Cl.
CPC .................................. *G06F 13/24* (2013.01)
(58) Field of Classification Search
CPC ........ G06F 13/24; G06F 13/40; G06F 9/4812; G06F 9/48; H04L 12/40
See application file for complete search history.

(56) References Cited

U.S. PATENT DOCUMENTS

| | | | | |
|---|---|---|---|---|
| 5,619,703 A | * | 4/1997 | Omid ...................... | G06F 13/24 |
| | | | | 710/261 |
| 10,467,889 B2 | * | 11/2019 | Litovtchenko ..... | G05B 19/0428 |
| 2004/0098527 A1 | * | 5/2004 | Kwatra ................... | G06F 13/24 |
| | | | | 710/260 |
| 2014/0337553 A1 | * | 11/2014 | Du .......................... | G06F 13/24 |
| | | | | 710/267 |
| 2016/0373909 A1 | * | 12/2016 | Rasmussen ............. | H04W 4/80 |
| 2020/0242058 A1 | * | 7/2020 | Lin ......................... | G06F 13/24 |
| 2022/0206971 A1 | * | 6/2022 | Yee ....................... | G06F 9/4812 |

OTHER PUBLICATIONS

Nuvoton, "NuMicro Family Mini51 DE Series Technical Reference Manual", Apr. 21, 2020, Revision 1.04 (Year: 2020).*

* cited by examiner

*Primary Examiner* — Phong H Dang
(74) *Attorney, Agent, or Firm* — Snyder, Clark, Lesch & Chung, LLP

(57)                    ABSTRACT
A bus slave device and an interrupt request determination method thereof are provided. The bus slave device sets interrupt request groups and interrupt request numbers to slave devices, respectively. A master device receives an interrupt request through an alarm pin, and each of the slave devices send interrupt request through the alarm pin, and an alarm detection module detects whether the alarm pin is at a low level. A selecting module selects an interrupt mode which is one of a level mode and a pulse mode. An interrupt request module sends or terminates the interrupt request. The master device configures the interrupt request group and the interrupt request number corresponding to the slave devices through the control module to generate a master device receiving signal, and transmits the master device receiving signal to the master device through the data pin and the clock pin.

10 Claims, 6 Drawing Sheets

BUS SLAVE DEVICE AND INTERRUPT REQUEST DETERMINATION METHOD THEREOF

CROSS-REFERENCE TO RELATED PATENT APPLICATION

This application claims the benefit of priority to Taiwan Patent Application No. 112126195, filed on Jul. 13, 2023. The entire content of the above identified application is incorporated herein by reference.

BACKGROUND OF THE INVENTION

Field of the Invention

The present disclosure relates to a bus slave device and an interrupt request determination method, and more particularly to a bus slave device and an interrupt request determination method that make a determination of the interrupt request more efficient through a novel setting method for the slave device.

Description of the Related Art

For the existing system management bus (SMBus) device, when a slave device connected thereto issues an interrupt request, a master device will issue a request to obtain an alert response address (ARA) after receiving an alarm signal from an alarm pin, and the obtained address is used to confirm a type of the slave device that issues the interrupt request. However, each ARA can only obtain a single slave device address. When multiple slave devices are connected to the SMBus, if multiple slave devices have interrupt request requirements, the SMBus device must repeatedly process multiple requests and responses to obtain information for all the slave devices. It is difficult to improve the processing efficiency, resulting in low system operation performance.

The slave devices connected to the SMBus device are not fixed and may be changed. Under the status of different slave devices being connected, the existing system architecture is unable to adjust the operation mode of interrupt requests based on the number of the slave devices. The more slave devices are connected, the harder it is to improve the operation efficiency of the system. It is impossible to choose the appropriate interrupt mode based on the number of devices, which has considerable limitations in actual operation.

In summary, the inventor of the present disclosure thought about and designed a bus slave device and an interrupt request determination method thereof, in order to improve the issues of the conventional technology and enhance industrial implementation and utilization.

SUMMARY OF THE INVENTION

In view of issues described in the prior art, the objective of present disclosure is to provide a bus slave device and an interrupt request determination method thereof to address the issue that the device operation performance is difficult to improve when multiple slave devices issue interrupt requests.

Based on the above objectives, the present disclosure provides a bus slave device, which includes a setting module, an alarm pin, an alarm detection module, a selection module, an interrupt request module, a control module, a data pin and a clock pin. The setting module is configured to set an interrupt request group to which the bus slave device belongs and an interrupt request number in the interrupt request group. The alarm pin is connected to a master device, and is configured to send an interrupt request of the bus slave device. The alarm detection module is connected to the alarm pin, and is configured to detect whether the alarm pin is pulled down to a low level to send the interrupt request. The selection module is connected to the alarm pin, and is configured to select an interrupt mode, wherein the interrupt mode is one of a level mode and a pulse mode. The interrupt request module is connected to the selection module, and is configured to send or terminate the interrupt request through the interrupt mode selected by the selection module. The control module is connected to the setting module and the interrupt request module, and the master device configures, through the control module, the interrupt request group and the interrupt request number corresponding to the bus slave device, so as to generate a master device receiving signal. The data pin and the clock pin are connected to the control module, and is configured to transmit the master device receiving signal to a master device.

Preferably, when the interrupt mode is the level mode, the master device receiving signal includes a group address and a serial number, and the plurality of slave devices that issue the interrupt request declare the corresponding interrupt request group in the group address, and declare the corresponding interrupt request number in the serial number.

Preferably, when the interrupt mode is the pulse mode, the alarm detection module further includes a counter that detects a pulse width of the alarm pin when the alarm pin is at the low level, the control module determines a detection group that issues the interrupt request based on the pulse width, and generates the master device receiving signal of the detection group based on a pulse group mode, the master device receiving signal includes the detection group and a serial number, and the interrupt request number in the detection group is declared in the serial number.

Preferably, when the plurality of slave devices issue the interrupt request synchronously, the detection group corresponding to a maximum one of the detected pulse width generates the interrupt request firstly, the plurality of slave devices that are not declared in the master device receiving signal reissue the interrupt request.

Preferably, the setting module sets a pulse width corresponding to the plurality of slave devices, and the control module is configured to determine a detection device that issues the interrupt request based on the pulse width, and generate the master device receiving signal of the detection device based on a pulse single mode.

Based on the above objectives, the present disclosure provides an interrupt request determination method of a bus slave device, the interrupt request determination method is used to determine an interrupt request of a plurality of slave devices in a system management bus device, and the interrupt request determination method includes: setting interrupt request groups to the plurality of slave devices, respectively, wherein each of the interrupt request groups includes an interrupt request number; detecting whether an alarm pin is pulled down to send the interrupt request by an alarm detection module; selecting an interrupt mode by a selection module, wherein the interrupt mode is one of a level mode and a pulse mode; sending the interrupt request based on the interrupt mode selected by the selection module, by an interrupt request module; generating a master device receiving signal from the interrupt request group and the interrupt request number corresponding to the plurality of bus slave devices, by a control module; and transmitting the master device receiving signal to a master device through a data pin and a clock pin.

Preferably, when the interrupt mode is the level mode, the master device receiving signal includes a group address and a serial number, and the plurality of slave devices that issue the interrupt request through the alarm pin declare the corresponding interrupt request group in the group address, and declare the corresponding interrupt request number in the serial number.

Preferably, when the interrupt mode is the pulse mode, the alarm detection module can detect the pulse width of the alarm pin at a low level through a counter. The setting module sets the pulse width corresponding to the plurality of slave devices, when a pulse group mode is set, the plurality of slave devices generate the pulse width of the interrupt request through the alarm pin, and the master device determines the individual interrupt requests among the plurality of slave devices based on the pulse width.

Preferably, when the plurality of slave devices issue the interrupt request synchronously, the interrupt request for the master device is firstly generated by the slave device corresponding to a maximum one of the detected pulse width, and the plurality of slave devices that are not confirmed reissue the interrupt request.

Based on the above objectives, the present disclosure provides an interrupt request determination method of a bus slave device, the interrupt request determination method is used to determine an interrupt request of a plurality of slave devices in a system management bus device, and the interrupt request determination method includes: selecting an interrupt mode of the plurality of slave devices by a selection module, wherein the interrupt mode is one of a level mode, a pulse group mode and a pulse single mode; when the plurality of slave devices are in the level mode or the pulse group mode, setting an interrupt request group and an interrupt request number of the plurality of slave devices by a setting module, and when the plurality of slave devices are in the pulse group mode or the pulse single mode, setting a pulse width of the plurality of slave devices by a counter; connecting the plurality of slave devices to an alarm pin, a data pin and a clock pin of a master device, wherein each of the plurality of slave devices detects a level of the alarm pin through an alarm detection module; determining whether an interrupt request is sent based on whether the alarm pin is at a low level, and determining whether the interrupt mode is the pulse single mode, if not, generating a master device receiving signal and providing a corresponding interrupt group address and waiting for a response from the plurality of slave devices, and if so, determining which one of the plurality of slave devices issues the interrupt request based on a determination result of detecting the pulse width, by the master device.

In summary, according to the bus slave device and the interrupt request determination method thereof of the present disclosure, which can have one or more of the following advantages:

(1) The bus slave device and the interrupt request determination method thereof can set the interrupt request group and the interrupt request number in the interrupt request group, to correspond to different addresses of the slave devices. When multiple ones of the slave devices issue interrupt requests, multiple slave device address information can be transmitted in a single master device receiving signal, thereby improving the efficiency of device operation.

(2) The bus slave device and the interrupt request determination method thereof can detect the pulse width of the alarm pin that is pulled down to a low level, so that the master device can receive the information of the interrupt request based on magnitudes of the pulse widths corresponding to the set interrupt request group, thereby reducing unnecessary signal transmission and waste of processing performance.

(3) The bus slave device and the interrupt request determination method thereof can select the interrupt mode through the selection module and adjust the interrupt mode based on the connection status between the system management bus device and the slave devices, so as to increase the diversity and convenience of actual operation.

BRIEF DESCRIPTION OF THE DRAWINGS

In order to make the technical features, content and advantages of the present disclosure and the effects it can achieve more apparent, the present disclosure is described with reference to the following drawings.

DETAILED DESCRIPTION OF THE PREFERRED EMBODIMENTS

In order to facilitate understanding of the technical features, contents and advantages of the present invention as well as the effects it can achieve, the present disclosure is described in detail below in conjunction with the accompanying drawings and in the form of embodiments. The drawings used therein are only for their main purpose. The figures are for illustration and auxiliary description purposes, and may not represent the actual proportions and precise configurations after implementation of the present invention. Therefore, the proportion and arrangement relationship of the attached drawings should not be interpreted to limit the scope of rights in the actual implementation of the present invention, which shall be explained in advance.

Figure 1:
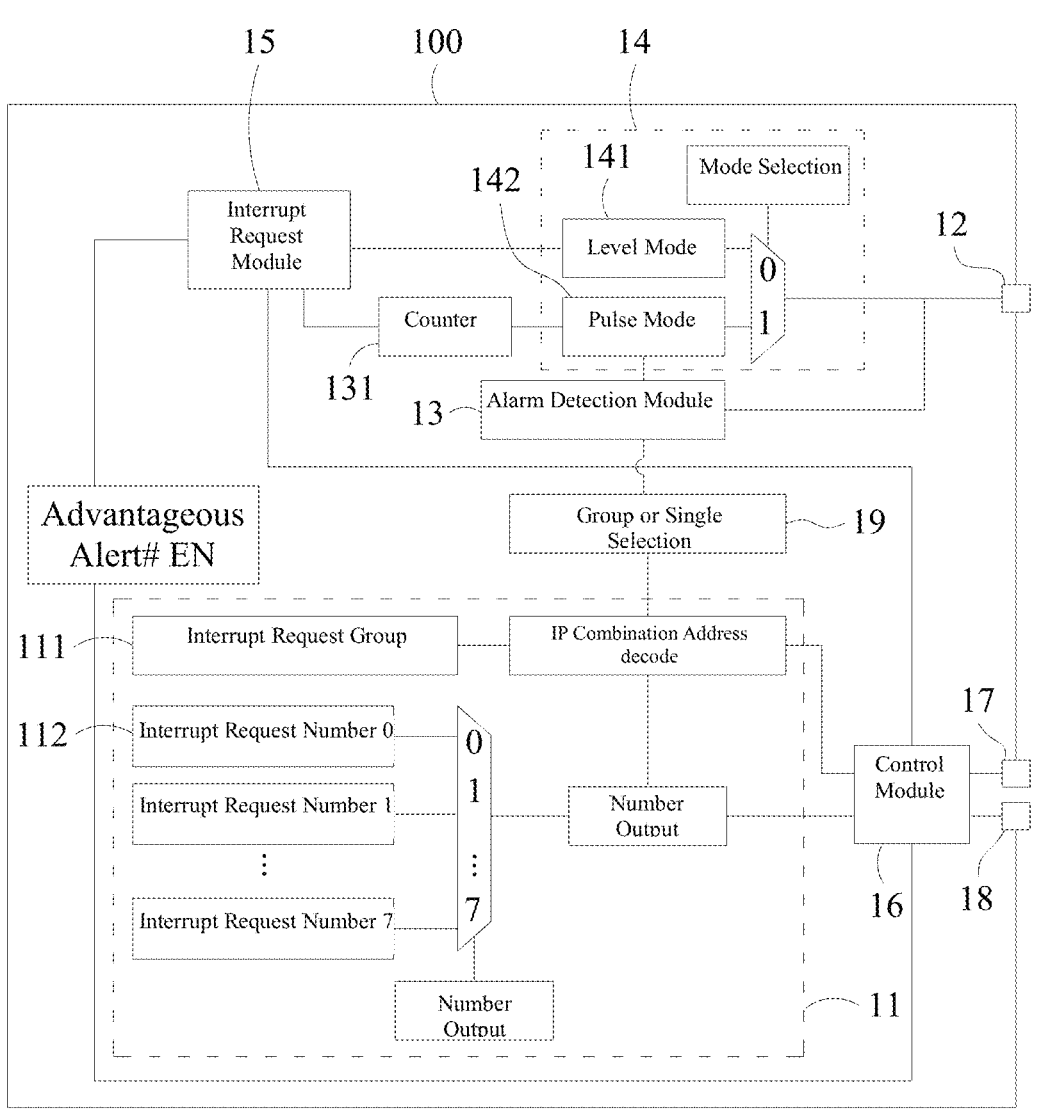
FIG. 1 is a schematic diagram of a bus slave device according to one embodiment of the present disclosure.

Referring to FIG. 1, FIG. 1 is a schematic diagram of a bus slave device according to one embodiment of the present disclosure. As shown in FIG. 1, the bus slave device 100 includes a setting module 11, an alarm pin 12, an alarm detection module 13, a selection module 14, an interrupt request module 15, a control module 16, a data pin 17 and a clock pin 18. The bus slave device 100 can process interrupt requests from slave devices that are coupled to the alarm pin 12. When the slave device issues an interrupt request, a level of the alarm pin 12 will be pulled down to notify the master device, which originally obtain an address of the slave device through an alert response address (ARA). Since there may be more than one slave device used or connected in a device, when multiple slave devices have interrupt request requirements, each ARA can only obtain a single slave device address, and it is not efficient in operation to allow the master device to obtain information from the slave device. Therefore, the present disclosure allows a plurality of bus slave devices 100 to handle interrupt requests of a plurality of slave devices through a novel device setting architecture.

First, the setting module 11 is configured to set an interrupt request group 111 to each of the slave devices, so that each of the slave devices has its own interrupt request group 111; an interrupt request number 112 of each of the slave devices is also set in the interrupt request group 111. The interrupt request group 111 and the interrupt request number 112 corresponds to an address of the slave device. Each byte contains eight bits, and eight interrupt request numbers 112 can be set in each interrupt request group 111. The numbers from 0 to 7 correspond to eight slave devices, respectively. By setting the interrupt request group 111 and the interrupt request number 112, when the slave device in the same interrupt request group 111 issues an interrupt request, one to eight of the slave devices can be simultaneously declared in the same master device receiving signal, thereby allowing the master device to obtain the slave device corresponding to the interrupt request more efficiently.

The bus slave device 100 sets an interrupt mode to be used through the selection module 14. The interrupt mode can be one of a level mode 141 and a pulse mode 142. In actual circuit operation, a multiplexer can be utilized to switch the interrupt mode between the level mode 141 and the pulse mode 142. The interrupt request module 15 is connected to the selection module 14, and sends an interrupt request through the interrupt mode selected by the selection module 14. The alarm detection module 13 detects the status of the alarm pin 12, and then determines whether it needs to stop or re-pull the level of the alarm pin 12 to a low level and send a message to the control module 16. The control module 16 can, based on the content set by the setting module 11, respond to the interrupt request of the slave device by transmitting the master device receiving signal to the master device through the data pin 17 and the clock pin 18. The following embodiments will illustrate the corresponding setting architecture according to different processing modes.

Figure 2:
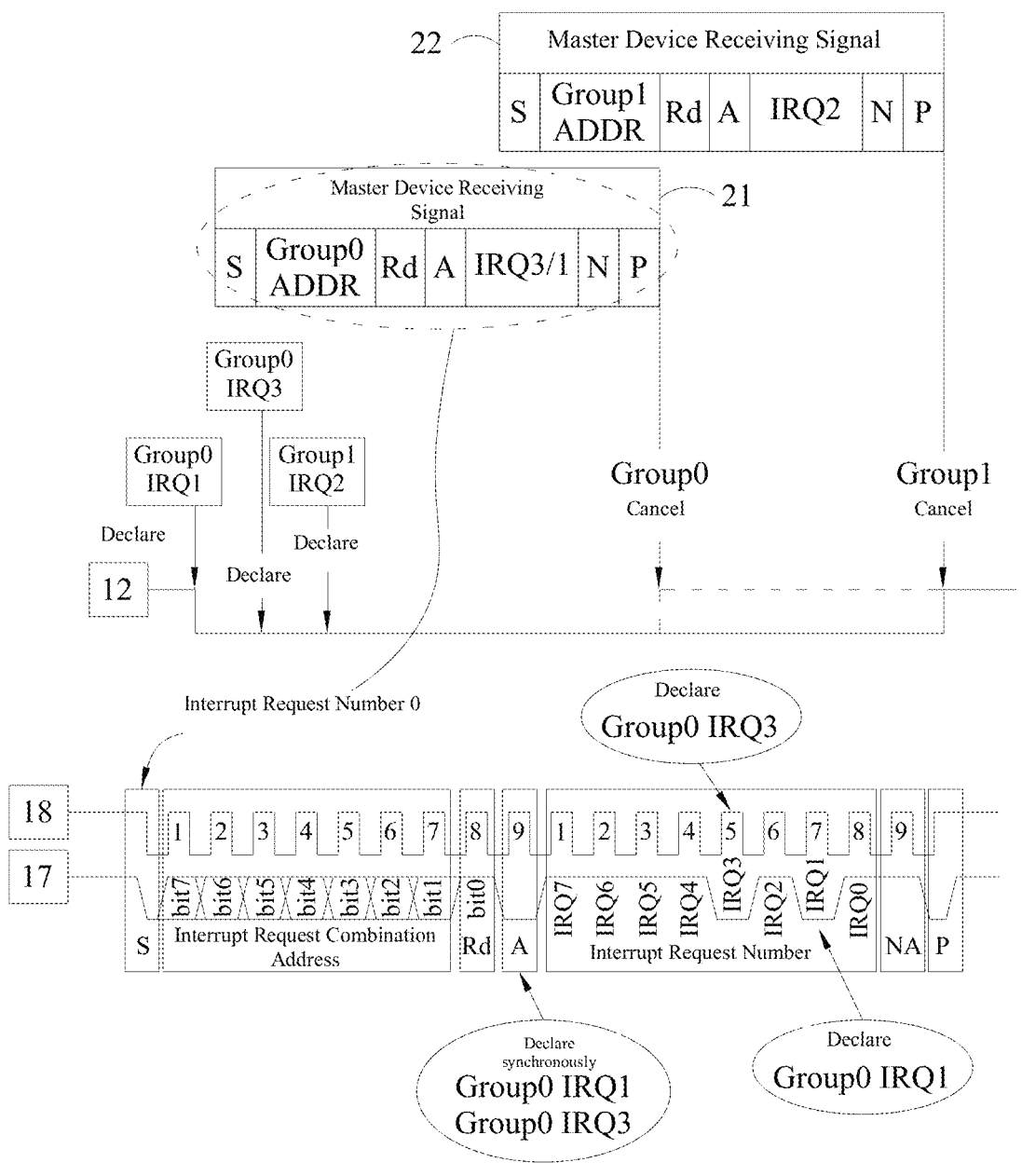
FIG. 2 is a schematic diagram of a waveform in the level mode according to one embodiment of the present disclosure.

Referring to FIG. 2, FIG. 2 is a schematic diagram of a waveform in the level mode according to one embodiment of the present disclosure. Reference is also made to FIG. 1. FIG. 2 shows operation waveforms of the alarm pin 12, the data pin 17 and the clock pin 18 in the level mode 141. In the present embodiment, a first slave device (Group0, IRQ1) is set as a slave device numbered 1 (IRQ1) in a first interrupt request group (Group0), and a second slave device (Group0, IRQ3) is set as a slave device numbered 3 (IRQ3) in the first interrupt group (Group0), and a third slave device (Group1, IRQ2) is set as a slave device numbered 2 (IRQ2) in a second interrupt request group (Group1). The number of interrupt request groups is determined by the number of devices connected thereto. One group contains 8 numbers, which correspond to the corresponding slave devices, respectively.

As shown in FIG. 2, when the first slave device, the second slave device, and the third slave device declare and issue interrupt requests in sequence, the alarm pin 12 of the master device that is connected to multiple slave devices will be pulled down to a low level, and the alarm pin 12 will remain at the low level after the first slave device sends out the interrupt request. During this period, the interrupt request module 15 transmit the interrupt request to the control module 16, triggering the control module 16 to generate the master device receiving signal, and the master device receiving signal communicates with the master device through the data pin 17 and the clock pin 18 to confirm the slave devices that issue the interrupt requests. A master device transmitting signal includes a start bit, an interrupt request group address, a read bit and an end bit. The master device receiving signal includes a determination bit and an interrupt request number bit, and a clock signal is provided by the master device through the clock pin 18. The plurality of slave devices sequentially output the above-mentioned data bits through the data pin 17 according to the clock signal. First, the master device sends the interrupt request group address after the start bit. The interrupt request group address is a plurality of slave devices of each set interrupt request group. In the level mode 141, the control module 16 declares the interrupt request group and the interrupt request number of each slave device in the master device receiving signal, for example, a first master device receiving signal 21, a second master device receiving signal 22, and so on.

Next, a bit is set to determine whether there is a declared slave device after the reading bit. If there is a slave device, a continued one of the interrupt request number will be the slave device number that originally issues the interrupt request. If the bit remains at a high level, it means there is no corresponding slave device in the group, then the master device stops transmitting signals directly to avoid unnecessary waste of time caused by data transmission in a clock cycle without declared data. In the first master device receiving signal 21, since the first slave device and the second slave device that issue the interrupt requests are both in the first interrupt request group (Group0) and are numbered 1 (IRQ1) and 3 (IRQ3), respectively, when the interrupt request number is 1 and 3, the two slave devices are declared through low-level signal waveforms, and finally the end bit is used to complete the master device receiving signal. Since the alarm pin 12 is still at the low level, the second master device receiving signal 22 is processed continuously. The master device can, in response to receiving the first master device receiving signal 21, simultaneously determine that the first slave device and the second slave device are the slave devices that issue the interrupt requests. In this embodiment, each master device receiving signal can respond messages for eight slave devices upmost. Compared with the original situation where each slave device sends an alarm response address for only responding to a single slave device address, the design of the above-mentioned master device receiving signals can indeed improve the processing efficiency of the device.

In the second master device receiving signal 22, the interrupt request issued by the third slave device that is numbered by 2 (IRQ2) in the second interrupt request group (Group1) is declared, such that the master device can obtain information of the third slave device. When completed, the alarm pin 12 returns to a high level, that is, there is no interrupt request from all slave devices. In this embodiment, two master device receiving signals are included, but the present disclosure is not limited thereto. The number of master device receiving signals can be adjusted according to the number of the interrupt request group.

Reference is made to FIG. 1 again. When the selection module 14 selects the pulse mode 142, in addition to detecting whether the alarm pin 12 is at a low level, the alarm detection module 13 further uses a counter 131. The counter detects the pulse width of the alarm pin 12 at the low level, that is, a length of time at the low level, while using the pulse width to assist in determination. In the pulse mode 142, the alarm detection module 13 can be divided into two determination methods, a pulse group mode and a pulse single mode, by an operation of a group or single selection 19. Differences between the two modes will be described below.

Figure 3A:
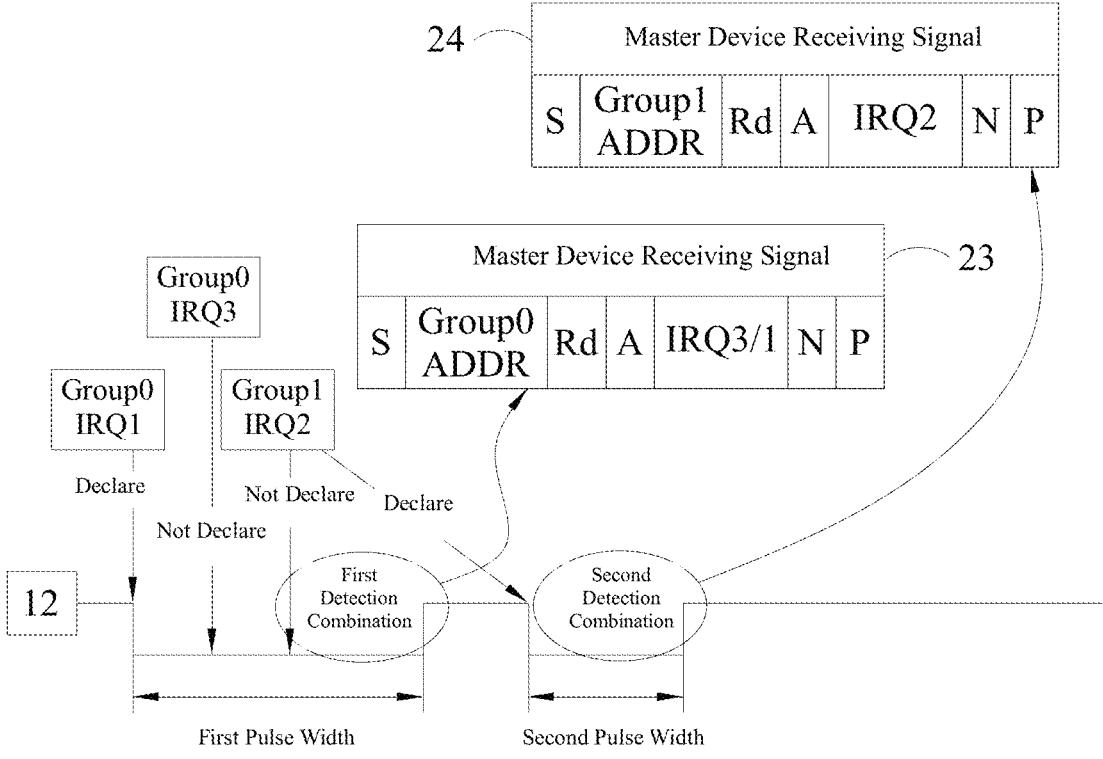
FIGS. 3A and 3B are schematic diagrams of waveforms of a pulse group mode according to one embodiment of the present disclosure.
Figure 3B:
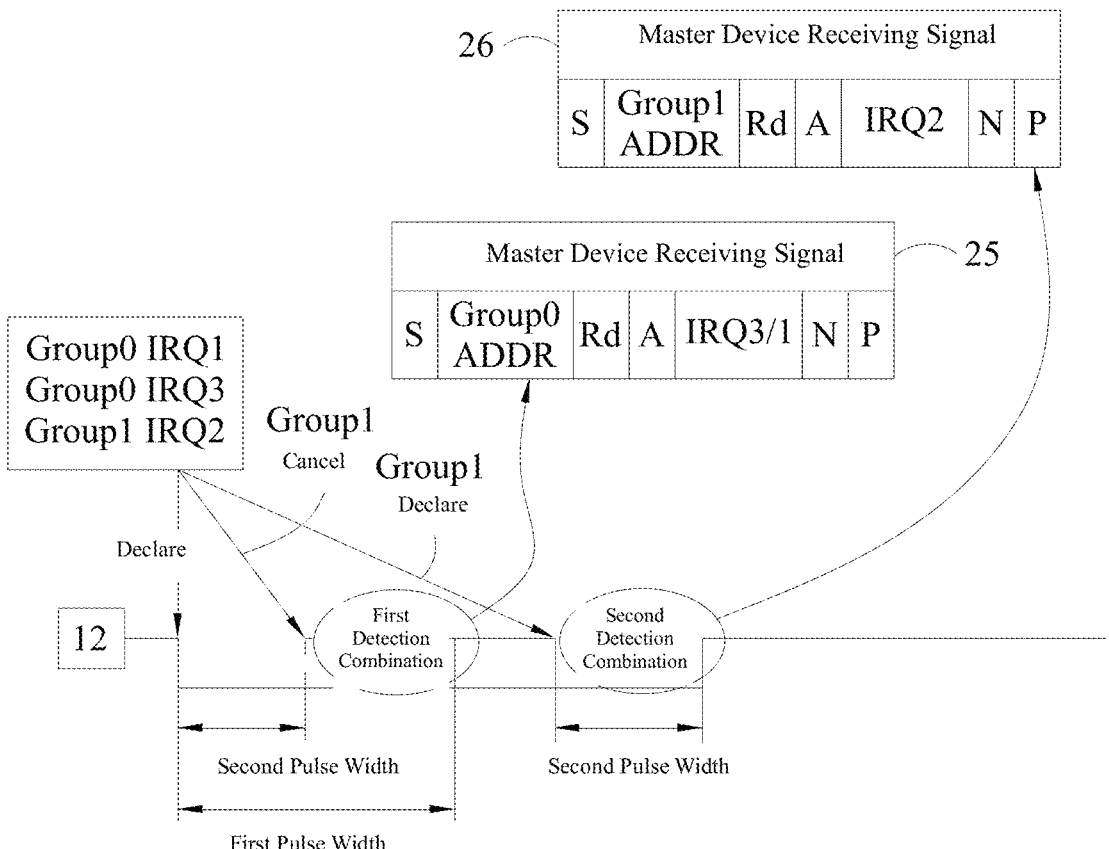

Referring to FIGS. 3A and 3B, FIGS. 3A and 3B are schematic diagrams of waveforms of a pulse group mode according to one embodiment of the present disclosure. FIG. 3A is a schematic diagram showing that a plurality of slave devices issue interrupt requests asynchronously, and FIG. 3B is a schematic diagram showing that the plurality of slave devices issue interrupt requests synchronously. In FIG. 3A, the first slave device (Group0, IRQ1) is set as the slave device numbered 1 (IRQ1) in the first interrupt request group (Group0), the second slave device (Group0, IRQ3) is set as the slave device numbered 3 (IRQ3) in the first interrupt request group (Group0), and the third slave device (Group1, IRQ2) is set as the slave device numbered 3 (IRQ2) in the second interrupt request group (Group1). The interrupt request module 15 sets the pulse width corresponding to the interrupt request group through the counter 131, such that slave devices belonging to the different interrupt request groups can pull down the alarm pin 12 for different set times when the interrupt requests are issued. The different detected pulse widths can correspond to different interrupt request groups, and the master device issues corresponding master device receiving signals based on the results of the detected groups.

As shown in FIG. 3A, the first slave device, the second slave device and the third slave device issue interrupt requests in sequence, that is, interrupt requests are issued in a non-synchronized manner. When the first slave device determines that the alarm pin 12 is at a high level through alarm detection module 13, the alarm pin 12 is pulled down to a low level, and the required pulse width of the low level is maintained through the counter 131. During this period, the second slave device belonging to the first interrupt request group (Group0) also issues the interrupt request, and the alarm pin 12 is detected to be at a low level through the alarm detection module 13 of the second slave device, and thus there is no need to pull the alarm pin 12 down to a low level. The pulse width is then counted by the counter 131 of the second slave device and is determined as belonging to the corresponding interrupt request group, therefore the second slave device can be regarded as having sent the interrupt request. In the first master device receiving signal 23, the first slave device declares the number 1 (IRQ1) and the second slave device declares the number 3 (IRQ3), and required information for the first master device receiving signal 23 is transmitted to the master device through the data pin 17 and the clock pin 18.

During the period when the alarm pin 12 is pulled down to a low level, the alarm pin 12 is detected to be at a low level through the alarm detection module 13 of the third slave device, so there is no need to pull the alarm pin 12 down to a low level. bit. Although the third slave device is predetermined to issue an interrupt request, the pulse width detected by the counter 131 of the third slave device is not the pulse width corresponding to the second interrupt request group (Group1) to which the third slave device belongs when the alarm pin 12 returns to the high level. Therefore, the third slave device does not complete the interrupt request. After the alarm pin 12 returns to the high level, the third slave device reissues an interrupt request and pulls the alarm pin 12 to a low level. When the pulse width detected by the master device is a second pulse width, it is determined that the interrupt request issued corresponds to the second interrupt request group (Group1). In the second master device receiving signal 24, the third slave device declares the number 2 (IRQ2), and information required by the second master device receiving signal 24 is transmitted to the master device through the data pin 17 and the clock pin 18. Through a determination mechanism performed based on the pulse widths, the master device can directly determine which interrupt request group it is, without wasting additional signal transmission time. When there are more interrupt request groups, more processing time can be saved through the pulse group mode.

In another embodiment, if multiple slave devices issue interrupt requests synchronously, the interrupt request with the maximum pulse width will be completed first. Reference is made to FIG. 3B. When the first, second, and third slave devices simultaneously issue interrupt requests, the alarm pin 12 will be pulled down to a low level. Since there are two different interrupt request groups (Group0 and Group1), set pull-down times are not the same. When the shorter second pulse width ends, the longer first pulse width will still keep the alarm pin 12 at the low level until the time of the first pulse width is completed before the alarm pin 12 returning to a high level. Therefore, when the counter 131 detects the pulse width, a time corresponding to the maximum pulse width will be detected first, such as the first pulse width in this embodiment, the master device then determines that the detected group is the first interrupt request group (Group0), and generates the first master device receiving signal 25. The interrupt group number of the first slave device and the second slave device in the first master device receiving signal 25 are transmitted to the master device.

Although the third slave device issues the interrupt request synchronously, the pulse width detected by the counter 131 thereof is not the pulse width corresponding to the second interrupt request group (Group1) to which the third slave device belongs. Therefore, the third slave device does not complete the interrupt request. After the first pulse width is transmitted, the third slave device reissues an interrupt request, pulls the alarm pin 12 down to a low level and keeps it with the second pulse width, which is determined by the master device as corresponding to the second interrupt request group (Group1), and then the second master device receiving signal 26 is generated. At this time, the interrupt group number of the third slave device is declared in the second master device receiving signal 26, and information required by the second master device receiving signal 26 is transmitted to the master device through the data pin 17 and the clock pin 18.

Figure 4A:
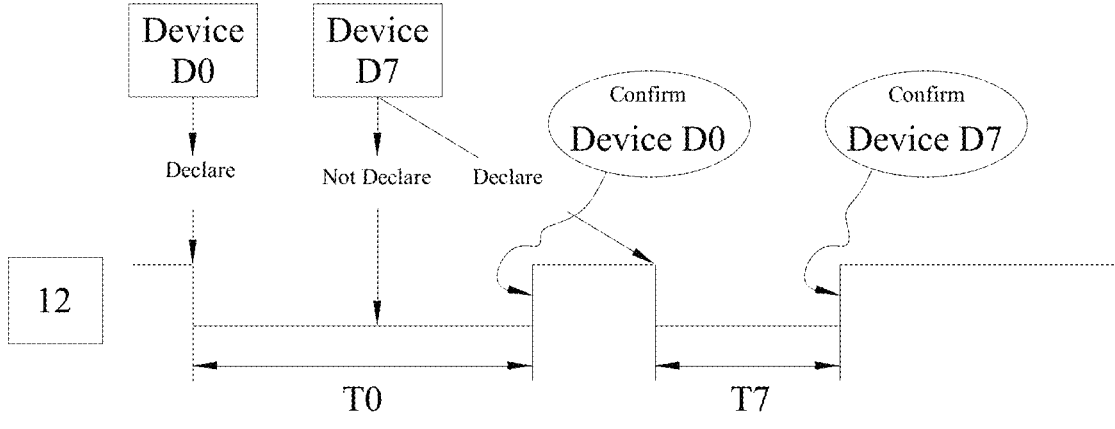
FIGS. 4A and 4B are schematic diagrams of waveforms of a pulse single mode according to one embodiment of the present disclosure.
Figure 4B:
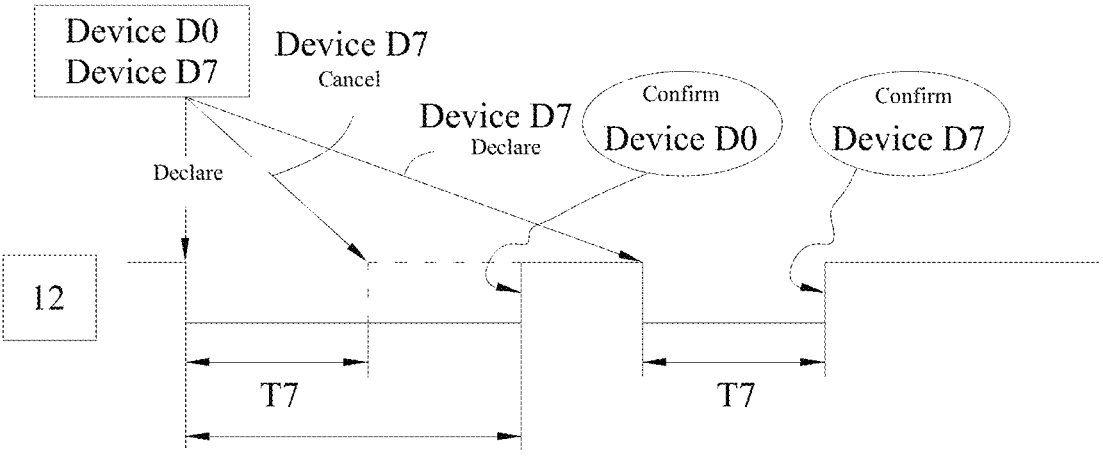

FIGS. 4A and 4B are schematic diagrams of waveforms of a pulse single mode according to one embodiment of the present disclosure. FIG. 4A is a schematic diagram showing that a plurality of slave devices issue interrupt requests asynchronously, and FIG. 4B is a schematic diagram showing that the plurality of slave devices issue interrupt requests synchronously. In FIG. 4A, the first slave device (D0) and the eighth slave device (D7) are respectively set with pulse widths corresponding to the counters 131 of each of the slave devices and are selected as the pulse single mode in the group or single selection 19. For example, the pulse width of the first slave device is a first pulse width (T0), and the pulse width of the eighth slave device is an eighth pulse width (T7). When the interrupt requests are issued, the alarm pin 12 will be pulled down for different set times. The detected different pulse widths directly correspond to the different slave devices.

As shown in FIG. 4A, the first slave device and the eighth slave device sequentially issue interrupt requests in an asynchronous manner. When the first slave device issues the interrupt request, the alarm pin 12 is pulled down to a low level, and the corresponding pulse width (T0) is sent through the counter 131. When the alarm pin 12 returns to a high level, the master device determines that the interrupt request corresponds to the first slave device. During this period, the eighth slave device is predetermined to issue an interrupt request. Since the alarm pin 12 is at the low level, there is no need to pull the alarm pin 12 low. However, when the alarm pin 12 returns to the high level, the pulse width detected by the alarm detection module 13 and the counter 131 of the eighth slave device is not the eighth pulse width (T7) corresponding to the eighth slave device. Therefore, the eighth slave device does not complete the interrupt request. Hence, the eighth slave device reissues an interrupt request, pulls the level of the alarm pin 12 low, and sends the corresponding eighth pulse width (T7) through the counter 131. The master device determines that the interrupt request is issued by the eighth slave device.

In another embodiment, when the slave device issues interrupt requests synchronously, the slave device corresponding to the maximum pulse width will complete the interrupt request first. Reference is made to FIG. 4B. When the first slave device and the eighth slave device issue interrupt requests at the same time, the alarm pin 12 will be pulled down to a low level. Since the two slave devices have different pull-down times, when the shorter eighth pulse width ends, the longer first pulse width still maintains the alarm pin 12 at the low level until the time of the first pulse width (T0) is completed before the alarm pin 12 returning to a high level. Therefore, when detecting the pulse width, the counter 131 of all devices will first detect a time corresponding to the maximum pulse width, such as the first pulse width (T0) in this embodiment, then determine that the interrupt request is issued by the first slave device, and the master device can confirm that the interrupt requester is issued by the first slave device.

Although the eighth slave device synchronously issues the interrupt request, the pulse width detected by the counter 131 thereof is not the eighth pulse width (T7). Therefore, the interrupt request cannot be determined to be issued by the eighth slave device, that is, the eighth slave device has not completed the interrupt request. After the interrupt request is confirmed to be issued by the first slave device, the eighth slave device reissues another interrupt request and pulls the alarm pin 12 low. When the pulse width sent by the counter 131 is the eighth pulse width (T7), the master device determines that the interrupt request is issued by the eighth slave device.

Figure 5:
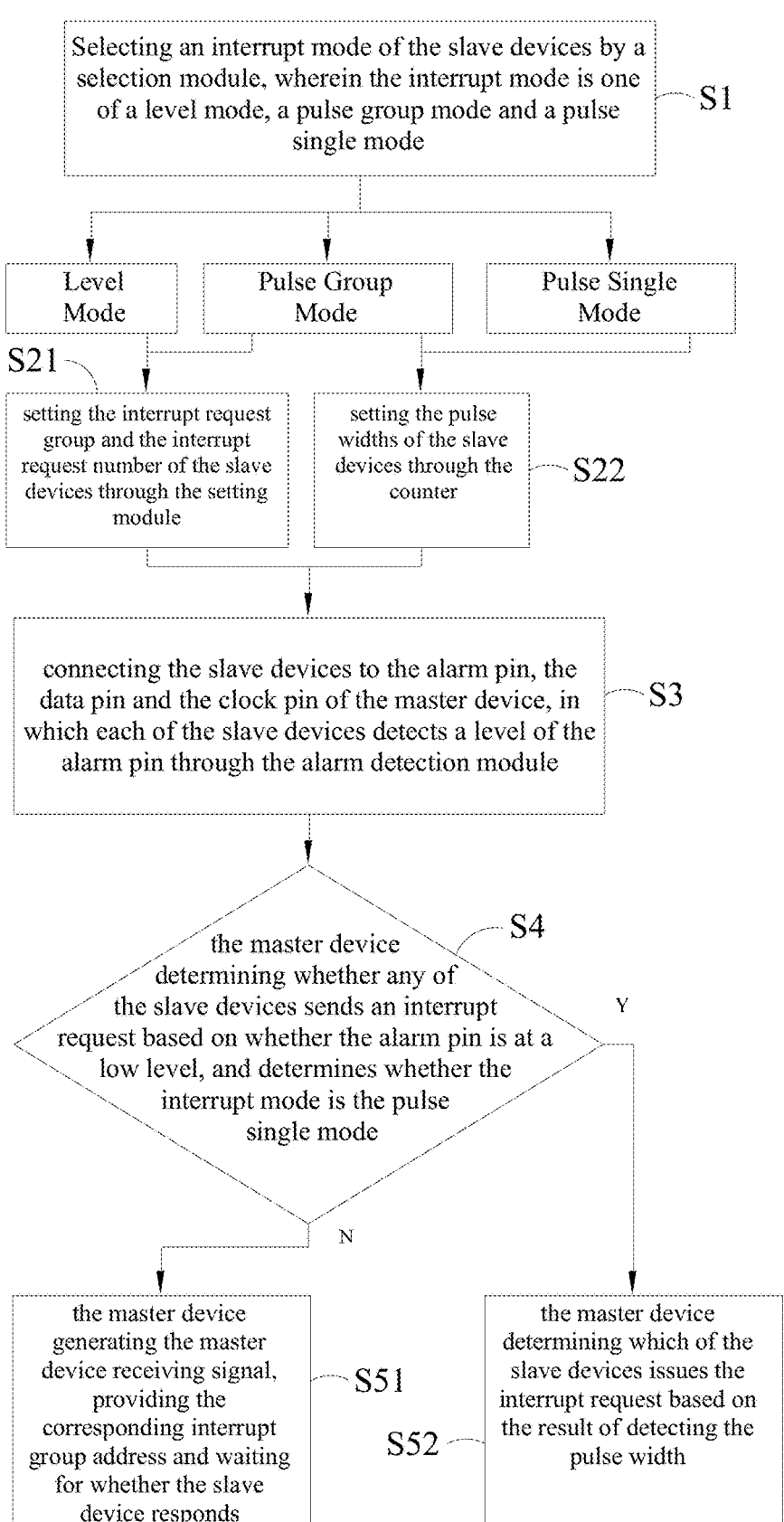
FIG. 5 is a flowchart of an interrupt request determination method of a system management bus device according to one embodiment of the present disclosure.

Referring to FIG. 5, FIG. 5 is a flowchart of an interrupt request determination method of a system management bus device according to one embodiment of the present disclosure. As shown in FIG. 5, the method for determining the interrupt request is used to determine interrupt requests from multiple slave devices in the SMBus device. Reference can be made to the aforementioned embodiments for the SMBus device, and the method for determining the interrupt request of the SMBus device includes the following steps (S1 to S5).

Step S1: selecting an interrupt mode of the slave devices by a selection module, wherein the interrupt mode is one of a level mode, a pulse group mode and a pulse single mode. All slave devices of the SMBus device must be configured as the same interrupt mode to avoid misjudgment by the master device, and the master device must know which interrupt mode is selected by the SMBus device at this time.

Step S2: setting the slave devices. In step S2, when the slave device is in the level mode or the pulse group mode, the method proceeds to step S21: setting the interrupt request group and the interrupt request number of the slave devices through the setting module; when the slave device is in the pulse group mode or pulse single mode, the method proceeds to step S22: setting the pulse widths of the slave devices through the counter. At the same time, the master device must know the interrupt request group and the interrupt request number of each of the slave devices, and must also know the pulse width of each of the slave devices. In one implementation, the master device can be responsible for configuring related settings of all slave devices.

Step S3: connecting the slave devices to the alarm pin, the data pin and the clock pin of the master device, in which each of the slave devices detects a level of the alarm pin through the alarm detection module. If the alarm pin is at a high level, the slave device with an interrupt request can send the interrupt request to the master device by pulling the alarm pin low.

Step S4: the master device determining whether any of the slave devices sends an interrupt request based on whether the alarm pin is at a low level, and determines whether the interrupt mode is the pulse single mode. By determining whether the alarm pin is at the low level, whether there is an interrupt request can be determined. Based on the interrupt mode used in the aforementioned settings, whether the master device receiving signal is generated can be further determined. If it is necessary to generate the master device receiving signal, the corresponding interrupt group address can be provided through the above settings, and waiting for whether the slave device responds.

When all slave devices are not operating in the pulse single mode, the method proceeds to step S51: the master device generating the master device receiving signal, providing the corresponding interrupt group address and waiting for whether the slave device responds. It can be determined that there is an interrupt request through the alarm pin being at a low level, and the master device receiving signal can be generated through the data pin and clock pin, and waiting for the slave device to respond, so as to correspondingly obtain the interrupt request group number of each of the slave devices.

When using the level mode, the master device receiving signal includes a group address and a serial number. The master device will send an interrupt request group address after the start bit, and then a bit is set after reading the bit to determine whether there is a declared slave device. If there is the declared slave device, a continued one of the interrupt request number will be the slave device number that originally issues the interrupt request. If there is no declared slave device, then the master device stops transmitting signals directly to avoid unnecessary waste of time caused by data transmission in a clock cycle without declared data. The slave devices can declare the corresponding interrupt requests into the serial number in the corresponding interrupt request group address, such that multiple slave devices can be output through the same master device receiving signal. The master device receiving signal includes a group address and a serial number. The slave devices declare detected corresponding interrupt request group in the group address and also declare the interrupt request number in the serial number.

When the pulse mode is used, the counter is further used to detect the pulse width of the alarm pin at a low level, and the pulse width is used to determine the interrupt request of the slave device. In the pulse group mode, the setting module sets the pulse width corresponding to the interrupt request group, such that slave devices belonging to the different interrupt request groups can pull down the alarm pin for different set times when the interrupt requests are issued. The different detected pulse widths can correspond to different interrupt request groups, and the corresponding master device receiving signals can be issued based on the pulse widths. The master device receiving signal can include a group address and a serial number. Each slave device in the same group address can declare the serial number of each of the slave device. If there are slave devices with different interrupt request groups synchronously issuing interrupt requests, the slave device with a larger pulse width will obtain the interrupt request first, and the slave device with a smaller pulse width will reissue the interrupt request.

When all slave devices operate in the pulse single mode, the method proceeds to step S52: the master device determining which of the slave devices issues the interrupt request based on the result of detecting the pulse width. When the different slave devices issue interrupt requests synchronously, the slave device corresponding to the detected maximum pulse width will obtain the interrupt request first, and the slave device with the smaller pulse width will retransmit the interrupt request.

The above is only illustrative and not restrictive. Any equivalent modifications or changes that do not depart from the spirit and scope of the present disclosure shall be included in the appended claims.

What is claimed is:

1. A bus slave device, comprising:
a setting module, configured to set an interrupt request group to which the bus slave device belongs and an interrupt request number in the interrupt request group;
an alarm pin, connected to a master device, and configured to send an interrupt request of the bus slave device;
an alarm detection module, connected to the alarm pin, and configured to detect whether the alarm pin is pulled down to a low level to send the interrupt request;
a selection module, connected to the alarm pin, configured to select an interrupt mode, wherein the interrupt mode is one of a level mode and a pulse mode;
an interrupt request module, connected to the selection module, and configured to send or terminate the interrupt request through the interrupt mode selected by the selection module;
a control module, connected to the setting module and the interrupt request module, wherein the master device configures, through the control module, the interrupt request group and the interrupt request number corresponding to the bus slave device, so as to generate a master device receiving signal; and
a data pin and a clock pin, connected to the control module, and configured to transmit the master device receiving signal to a master device.

2. The bus slave device according to claim 1, wherein, when the interrupt mode is the level mode, the master device receiving signal comprises a group address and a serial number, and the plurality of slave devices that issue the interrupt request declare the corresponding interrupt request group in the group address, and declare the corresponding interrupt request number in the serial number.

3. The bus slave device according to claim 1, wherein, when the interrupt mode is the pulse mode, the alarm detection module further comprises a counter that detects a pulse width of the alarm pin when the alarm pin is at the low level, the control module is configured to determine a detection group that issues the interrupt request based on the pulse width, and generate the master device receiving signal of the detection group based on a pulse group mode, the master device receiving signal comprises the detection group and a serial number, and the interrupt request number in the detection group is declared in the serial number.

4. The bus slave device according to claim 3, wherein, when the plurality of slave devices issue the interrupt request synchronously, the detection group corresponding to a maximum one of the detected pulse width generates the interrupt request firstly, the plurality of slave devices that are not declared in the master device receiving signal re-issue the interrupt request.

5. The bus slave device of claim 1, wherein the setting module sets a pulse width corresponding to the plurality of slave devices, and the control module is configured to determine a detection device that issues the interrupt request based on the pulse width, and generate the master device receiving signal of the detection device based on a pulse single mode.

6. An interrupt request determination method of a bus slave device, the interrupt request determination method is used to determine an interrupt request of a plurality of slave devices in a system management bus device, the interrupt request determination method comprising:
setting interrupt request groups to the plurality of slave devices, respectively, wherein each of the interrupt request groups comprises an interrupt request number;
detecting whether an alarm pin is pulled down to a low level to send the interrupt request by an alarm detection module;
selecting an interrupt mode by a selection module, wherein the interrupt mode is one of a level mode and a pulse mode;
sending the interrupt request based on the interrupt mode selected by the selection module, by an interrupt request module;
generating a master device receiving signal from the interrupt request group and the interrupt request number corresponding to the plurality of bus slave devices, by a control module; and
transmitting the master device receiving signal to a master device through a data pin and a clock pin.

7. The interrupt request determination method according to claim 6, wherein, when the interrupt mode is the level mode, the master device receiving signal comprises a group address and a serial number, and the plurality of slave devices that issue the interrupt request through the alarm pin declare the corresponding interrupt request group in the group address, and declare the corresponding interrupt request number in the serial number.

8. The interrupt request determination method according to claim 6, wherein, when the interrupt mode is the level mode, the alarm detection module is configured to detect a pulse width of the alarm pin that is at the low level through a counter; wherein the setting module is configured to set the pulse width corresponding to the plurality of slave devices, when a pulse group mode is set, the plurality of slave devices generate the pulse width of the interrupt request through the alarm pin, and the master device determines the individual interrupt requests among the plurality of slave devices based on the pulse width.

9. The interrupt request determination method according to claim 8, wherein, when the plurality of slave devices issue the interrupt request synchronously, the interrupt request for the master device is firstly generated by the slave device corresponding to a maximum one of the detected pulse width, and the plurality of slave devices that are not confirmed re-issue the interrupt request.

10. An interrupt request determination method of a bus slave device, the interrupt request determination method is used to determine an interrupt request of a plurality of slave devices in a system management bus device, the interrupt request determination method comprising:

selecting an interrupt mode of the plurality of slave devices by a selection module, wherein the interrupt mode is one of a level mode, a pulse group mode and a pulse single mode;

when the plurality of slave devices are in the level mode or the pulse group mode, setting an interrupt request group and an interrupt request number of the plurality of slave devices by a setting module, and when the plurality of slave devices are in the pulse group mode or the pulse single mode, setting a pulse width of the plurality of slave devices by a counter;

connecting the plurality of slave devices to an alarm pin, a data pin and a clock pin of a master device, wherein each of the plurality of slave devices detects a level of the alarm pin through an alarm detection module;

determining whether an interrupt request is sent based on whether the alarm pin is at a low level, and determining whether the interrupt mode is the pulse single mode, if not, generating a master device receiving signal and providing a corresponding interrupt group address and waiting for a response from the plurality of slave devices, and if so, determining which one of the plurality of slave devices issues the interrupt request based on a determination result of detecting the pulse width, by the master device.

* * * * *